United States Patent [19]

Bratten

[11] Patent Number: 4,774,010
[45] Date of Patent: Sep. 27, 1988

[54] TANK FILTER WITH CONVEYOR FLIGHT DRIVEN FILTER MEDIA BELT

[76] Inventor: Jack R. Bratten, 5970 St. James Dr., West Bloomfield, Mich. 48033

[21] Appl. No.: 535

[22] Filed: Jan. 5, 1987

[51] Int. Cl.⁴ .................. B01D 21/04; B01D 29/02
[52] U.S. Cl. .................................. 210/791; 210/803; 210/387; 210/526
[58] Field of Search ............... 210/791, 387, 400, 401, 210/526, 783, 803, DIG. 3; 226/74, 171

[56] References Cited

U.S. PATENT DOCUMENTS

| | | | |
|---|---|---|---|
| 3,221,885 | 12/1965 | Hirs | 210/387 |
| 4,055,497 | 10/1977 | Creps et al. | 210/526 |
| 4,389,315 | 6/1983 | Crocket | 210/387 |
| 4,394,272 | 7/1983 | Damerau | 210/791 |
| 4,396,505 | 8/1983 | Willson et al. | 210/387 |
| 4,421,645 | 12/1983 | Creps et al. | 210/526 |

FOREIGN PATENT DOCUMENTS 1128061 9/1968 United Kingdom ............... 210/387

Primary Examiner—Richard V. Fisher
Assistant Examiner—Linda S. Evans
Attorney, Agent, or Firm—John R. Benefiel

[57] ABSTRACT

A tank filter having a drag conveyor circulating through the tank interior, the conveyor having flights frictionally engaging a disposable filter media belt to advance the same through the tank during indexing cycles, the belt unconnected to the conveyor to readily separate from the conveyor after passing out of the tank. A distributed bias force generating arrangement is employed to establish a sufficient frictional engagement of the conveyor flights to reliably drive the filter media belt, the arrangement comprised of a pair of spring loaded bars acting on the conveyor to urge the conveyor flights into frictional engagement with the filter media belt, allowing the use of a more steeply inclined exit end wall for a more compact tank structure.

8 Claims, 1 Drawing Sheet

TANK FILTER WITH CONVEYOR FLIGHT DRIVEN FILTER MEDIA BELT

FIELD OF THE INVENTION

This invention concerns filtration apparatus, and more particularly tank filters of the type having a drag conveyor circulating though the tank interior with a filter media belt disposed beneath the conveyor flights to be driven through the tank by frictional engagement therewith.

BACKGROUND OF THE INVENTION

There has heretofore been developed a tank type filter utilizing a disposable filter media belt, as disclosed in U.S. Pat. Nos. 3,087,620; 3,091,336; 3,221,885; and 4,396,505.

In this type of filter, a drag conveyor is circulated through the tank interior, typically across the tank bottom over a perforate plate covering a vacuum box, which receives filtered liquid which has passed through the portion of the filter media belt overlying the perforate plate.

According to the concept of this type of filter, the filter media belt is disposable, and is fed off a feed roll and thence through the tank interior, over the perforate bottom plate, and out of the tank to be collected for disposal. The filter media belt is periodically indexed as the section over the perforate bottom plate becomes clogged, drawing in an additional length from the feed roll at one end of the tank, while a corresponding used section of filter media is passed out from the opposite exit end wall of the tank.

The drag conveyor is employed to carry the heavy filtered solids out of the tank, and for this purpose has a series of spaced bars or "flights" extending across the width of the tank, connecting opposite chain loops disposed on either side thereof. The chain loops are driven by suitable sprockets during indexing to advance the conveyor through the tank interior. The filter media belt lies between the conveyor flights and the tank interior surfaces extending along the circulation path of the conveyor.

Since the media belt is not recirculated, as is the drag conveyor, the conveyor and filter media belt are not connected together, allowing the filter media belt to pass off the conveyor as each is indexed to move out of the tank, enabling the used segments of the filter media belt to be readily collected and disposed of. This unconnected relationship between the conveyor and filter media belt requires some means for driving the filter media belt to be advanced with the conveyor during indexing.

The disposable media belt is constructed of relatively weak material, such as thin filter paper and cannot be simply pulled through the tank, as by a powered windup roller, since the high friction created by the filter media belt lying beneath the flights of the chain conveyor develops a high resistance to belt movement relative to the conveyor, resulting in tearing of the filter media belt if it were simply attempted to be pulled through the tank. Tearing allows unfiltered liquid to pass through the openings and into the outlet.

It is also important that the filter media belt remain flat at all times, since bunching results in uncontrolled movement and in unfiltered liquid getting around the filter media belt edges and into the outlet.

According to past practices with such filters, frictional engagement of the conveyor flights is primarily relied on to move the filter media belt during indexing, although take up or pinch rollers are sometimes used to assist this action. The aforementioned rollers sometimes themselves create problems by the used filter media sticking to the rollers, causing wadding and bunching of the media on these elements.

Heretofore, the weight of the conveyor has been relied on to establish sufficient frictional engagement between the flights and the filter media belt. This arrangement creates a distributed driving engagement which operates very advantageously to advance the relatively low tensile strength media belt without bunching or tearing.

The simple weight biased frictional engagement between the conveyor and filter media requires that a relatively shallowly angled exit end wall be incorporated in the filter tank, and a maximum of 45° of inclination has been considered to be the upper limit of such inclination. Any steeper angles reduce the component of the weight of the conveyor pressing on the filter media belt to a point where the frictional force developed is inadequate for achieving reliable advance of the belt by the movement of the conveyor. If slippage does occur, there is a tendency for solid particles to tear openings in the media belt and for the belt to bunch and wad.

The shallowly angled exit end wall adds substantially to the overall length of the filter apparatus.

This increase in overall length of the apparatus required by the shallowly inclined exit end wall is disadvantageous, as it requires considerable additional space to accommodate the filter, which space may not be available at a given site. This added length also directly increases the cost of the filter itself by the additional conveyor and tank structure components required to extend the filter length.

There has heretofore been employed in such filters chip shielding plates spaced above each conveyor chain loop. If a considerable wadding of the media belt occurs, due to excessive belt slippage, a positive drive is in effect established by the media wad wedging against a conveyor flight eliminating the slippage. However, this causes highly localized pulling of the media belt, and sometimes results in tearing of the filter media belt.

SUMMARY OF THE INVENTION

The present invention comprises an improved filter of the type described in which a bias force generating device is employed, producing a self adjusting bias force distributed along the length of the section of the conveyor which is extended along the tank exit end wall section. The distributed bias force augments the gravity induced frictional engagement force of the conveyor flights with the filter media belt. This augmentation allows a much steeper inclination of the exit section to allow substantial shortening of the length of the exit end wall otherwise required.

The bias force generating device comprises a pair of elongated bars, each disposed on either side and along the tank exit end wall section along which the chain loops of the drag conveyor pass in moving over the tank exit end wall.

Each bar is positioned in engagement with a respective chain loop by a series of springs, preferably constituted by spring washer sets disposed over studs fixed to the bars. The studs pass through holes in mounting angles, and are retained by adjusting nuts threaded onto the ends of each stud. The spring sets develop a sharply increased bias force with relatively slight decreases in the compressed height thereof which occur if the bars are moved to lift the adjusting nuts off the supporting angles. Thus, if slight slippage of the filter media belt occurs, the slight bunching and rise up of the conveyor flight causes a substantially increased engagement force to be generated, which tends to quickly and automatically reach a level necessary to eliminate the filter media belt slippage.

The engagement force is applied and distributed along the entire length of the chain loops lying over the tank end wall, so that the application of localized excessive friction forces tending to tear the media belt are avoided. At the same time the spring sets automatically allow adjusting movement of the bars away from the tank end wall surface caused by particles or filtrate buildup under the conveyor flights, and avoid consequent jamming of the chain loops as these rise up over the solids on the filter media belt.

DETAILED DESCRIPTION

In the following detailed description, certain specific terminology will be employed, and a particular embodiment described in accordance with the requirements of 35 USC 112, but it is to be understood that the same is not intended to be limiting inasmuch as the invention is capable of taking many forms and variations within the scope of the appended claims.

Figure 1:
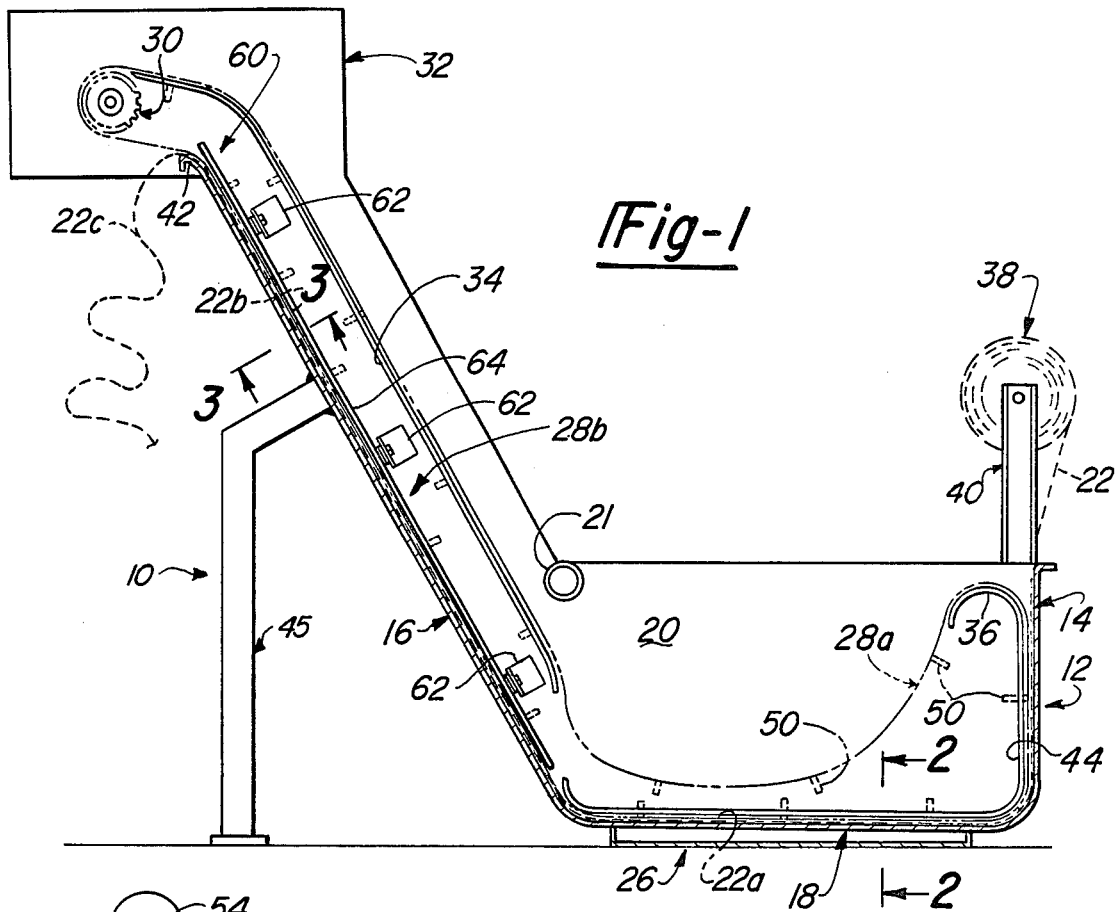
FIG. 1 is a side elevational view of a tank filter according to the present invention, with a schematic representation of a drag conveyor extending through a circulation path through the filter tank.

FIG. 1 shows the essential components of the filter apparatus 10 of which the present invention is an improvement.

This includes an open topped filter tank 12, defined by a series of generally upright walls, including entrance and exit end walls 14, 16, and a bottom 18.

Liquid to be filtered is introduced into the interior space 20 of the filter tank 12, as through inlet pipe 21. Liquid is filtered by being passed through a segment 22A of a filter media belt 22 which lies across a perforate plate 24, forming a part of the tank bottom 18.

Filtered liquid passes into a vacuum box 26 located below the perforate plate 24 to collect the filtered liquid which then is drawn out by the filter circulation system (not shown).

The filter apparatus 10 is of the type including a drag conveyor 28 which extends around a drive sprocket 30 housed within cover 32, and through a closed loop circulation path lying at least partially within the tank interior space 20. The circulation path lies along the tank entrance end wall 14 across the tank bottom 18 and along the tank exit end wall 16.

The drag conveyor 28 extends along a return path defined by guide plates 34, descending back into the interior of the tank 12, and is draped to form a catenary, extending unsupported across to a curved end portion 36 of each of guide plates 44. The weight of the catenary segment 28A of the drag conveyor 28 creates a pulling force insuring smooth movement of the drag conveyor 28 off the drive sprocket 30.

The drag conveyor 28 is indexed periodically by rotation of the drive sprocket 30 whenever a need for renewal of the filter media belt is detected as by operation of automatic controls, in the manner well known to those skilled in the art.

During such indexing, filtering flow through the media is discontinued, in order to eliminate the pressure differential across the filter media belt 22 and thus make easier movement of the filter media belt 22 during indexing. Suitable means for accomplishing this without discontinuing a flow of filtered liquid are well known and described in the above referenced U.S. patents.

The disposable filter media belt 22 is fed off a feed roll 38 supported above the tank 12, as by channel legs 40, and passes into the space between the interior surface of the entrance end wall 14 and the drag conveyor 28. The filter media belt 22 extends along that portion of the circulating path of the drag conveyor 28 lying adjacent the tank interior surfaces, passing off an upper terminal lip 42 of the exit end wall 16 so as to be able to be collected for disposal.

The lip 42 is inclined away from the path defined by exit side wall 16. The drive sprocket 30 is located so that the drag conveyor 28 changes direction at this point and thus is drawn against the lip 42. The drive of the drag conveyor 28 by rotation of the drive sprocket thereby increases the force of frictional engagement of the drag conveyor 28 with the filter media belt 22 in this region, and assists advance of the filter media belt 22.

Each segment 22C of the saturated filter media belt successively passes off the drag conveyor 28 to be collected and disposed of in the manner well known to those skilled in the art.

The drag conveyor 28 passes beneath a pair of chip shielding guide plates 44 each fastened on a respective tank side wall 46A, 46B extending down the entrance end wall 14 and across the bottom 18 of the tank 12.

The exit side wall 16 is inclined as shown in FIG. 1, supported by one or more braces 45, the inclination thereof causing a component of the weight of the segment of drag conveyor 28B passing thereover to force it against the segment of the filter media belt 22B lying beneath it, to establish a frictional engagement of the drag conveyor section 28B therewith.

Figure 2:
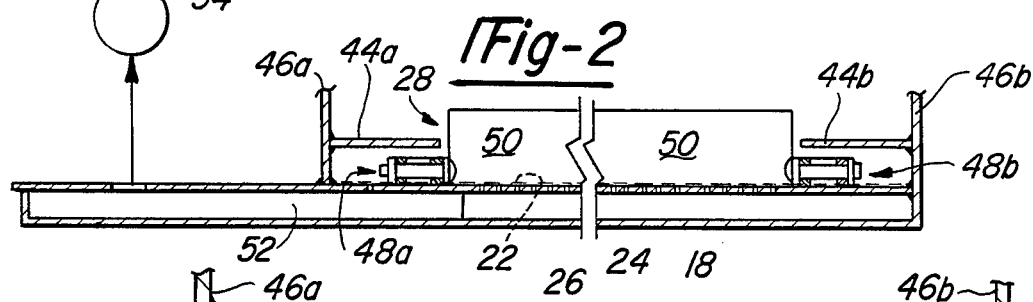
FIG. 2 is a fragmentary view of the section 2—2 taken in FIG. 1.

FIG. 2 illustrates the details of the drag conveyor 28 and tank bottom structure. The drag conveyor 28 includes a pair of chain loops 48A and 48B disposed on either side thereof and a series of spaced flights 50 connected therebetween, located to have the bottom edges flush with the bottom of chain loops 48A and 48B. The filter media belt 22 is thus frictionally engaged by each flight 50 disposed across a portion of the filter media belt 22.

The perforate plate 24 forms the top of the vacuum box 26, which extends to an outlet chamber 52 located alongside one of the lateral side walls 46A to enable plumbing connections to the pump and the remainder of the liquid circulation system components 54, collectively designated schematically by the numeral 54.

Inasmuch as these components as well as the electrical controls, etc. are very well known and do not form a part of the present invention, details of the same are not here described particularly.

The chip shielding guide plates 44A and 44B are spaced a sufficient height above the tank bottom 18 to clear the top of the respective chain loop 48A or 48B by one eighth inch or so, to allow for substantial loops 48A, 48B. This clearance avoids jamming when solid particles are encountered by the flights 50.

According to the concept of the present invention, the inclination of the exit end wall 16 is much steeper than the conventional 45° angle, i.e., 60° or steeper from the horizontal, as shown. This substantially reduces the gravity component urging the drag conveyor 28 into frictional engagement with the filter media belt 22.

Accordingly, the filter apparatus 10 according to the present invention employs an arrangement for augmenting the engagement force between the conveyor and the filter media belt. This arrangement comprises self adjusting, distributed bias force generating devices 60, each mounted to act on one of the drag conveyor segment 28B which is diposed extending up the inclined, exit end wall 16.

Figure 3:
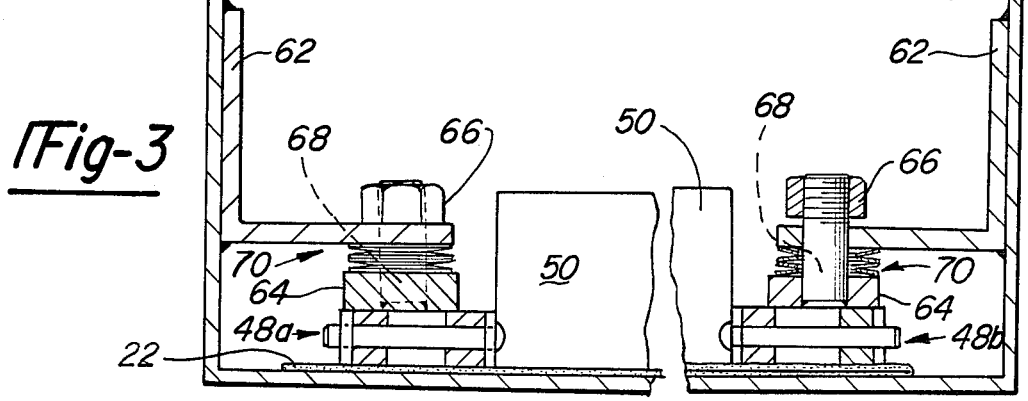
FIG. 3 is a fragmentary view of the section 3—3 taken in FIG. 1, with the right hand portion shown in the condition with the conveyor flights raised slightly from the normal condition.

FIG. 3 illustrates the details of each distributed bias force generating device 60.

This includes a series of mounting angles 62 welded spaced apart along the inside of each side wall 46A, 46B. An elongated bar 64 is mounted to the angles 62 so as to be movable towards and away from a respective chain loop 48A, 48B but is urged into frictional engagement therewith by an arrangement including a series of studs 68 welded to each bar 64, and a washer spring set 70 received over each stud 68 and interposed between the angle 62 and the bar 64. An adjusting nut 66 is threaded to each stud 68 to adjustably compress the washer spring set 70. Each nut 66 is adjusted at assembly so that the chain loops 48A and 48B are frictionally engaged with a moderate pressure exerted by the bars 64 so as to establish a frictional drive of the filter media belt 22 by engagement of the flights 50. The adjustment is such as to avoid a heavy wearing friction of the chain loops 48A, 48B beneath the bars 64.

If slippage does occur, the tendency is for slight bunching to occur, causing the flights 50 to rise as shown on the right in FIG. 3, increasing the frictional force of engagement by the additional compression of the washer spring sets. The spring force in such "belleville" springs for a given increment of compression increases rapidly, so that a self adjusting friction force is created. The lift off of the adjusting nut 66 causes the full force of the spring set 70 to be exerted on the bar 64 and chain loop 48A or 48B, accentuating the increase in bias force with a relatively slight rise of the flight 50.

At the same time, the "give" of the spring bar allows movement away from the tank interior surface, insuring that jam conditions will be avoided, as might otherwise be caused by chips getting under the flights 50 or chain loops 48.

Ready adjustment for proper frictional engagement between the flights 50 and filter media belt 22 is enabled by the exposed nuts 66, so that maintenance is made easier.

The distributed bias force applied by the elongated bars 64 urged against the filter media belt 22 by each series of washer spring sets 70 results in an effective frictional drive of the filter media belt 22, despite a much more sharply inclined exit end wall 16, making for a much more compact filter installation.

I claim:

1. In a filter apparatus of the type comprising:
   an open topped filter tank formed by a pair of generally upright opposite vertical sides, a bottom structure and opposite entrance and exit end walls connected by said tank sides;
   an inlet means for introducing liquid to be filtered into said filter tank;
   a perforate plate forming a portion of the bottom structure of said filter tank;
   a tank outlet means including a space beneath said perforate plate;
   a drag conveyor arranged to circulate through a closed loop path, at least a portion of which extends through the interior of said tank, descending along the entrance end wall of said tank comprising an entrance conveyor path thereinto, thence across said bottom structure, and thence ascending the opposing exit end wall forming a conveyor exit path from said tank;
   said drag conveyor including a pair of chain loops disposed along and on either side of said circulation path, and a plurality of spaced flight bars connected between said chain loops;
   drive means for periodically indexing said drag conveyor along said circulation path;
   a filter media belt interposed between said drag conveyor and adjacent tank interior surfaces so as to be frictionally engaged by said flight bars to be carried along said circulation path including portions of said filter media belt ascending the exit end wall of said tank overlain by segments of said chain loops;
   the improvement comprising: said exit end wall steeply inclined substantially in excess of 45° from the horizontal, and bias force generating means for applying a force to increase frictional engagement between the filter media belt and segments of said drag conveyor chain loops distributed along the portion of said filter media belt ascending the exit end wall of said tank.

2. The filter apparatus according to claim 1 wherein said bias force generating means includes a pair of bars mounted extending along either side of said tank, each bar disposed over a respective one of said segments of said chain loops ascending said exit end wall, each of said bars mounted to be able to move towards and away from said chain loop segments; and, means urging each of said bars to engage said chain loop segments.

3. The filter apparatus according to claim 2 wherein said means urging each of said bars comprises a series of spring means spaced along the length of each bar and a series of spring means mounting members fixed in said tank, each of said spring means compressed against the respective mounting member and acting to urge said bar to engage said chain loop segments.

4. The filter apparatus according to claim 3 wherein each of said series of spring means includes means for adjusting the compression of each of said series of spring means against the respective mounting member.

5. The filter apparatus according to claim 4 wherein said means for adjusting each spring means comprises a threaded stud fixed to said bar and having a portion extending through one said mounting member, and a nut threaded to said portion of said stud.

6. The filter apparatus according to claim 3 wherein each of said spring means comprises spring washer sets.

7. The filter apparatus according to claim 1 further including a terminal guide lip surface disposed along the exit path of said drag conveyor, extending at an inclination to said circulation path and wherein said drive means for said drag conveyor is located to cause a change in direction of said drag conveyor chain loops to draw said drag conveyor against said terminal lip to increase the force of engagement of said flights with said filter media belt.

8. A method of driving a disposable filter media belt through a path in a tank formed by vertical walls including an entrance end wall and an exit end wall and a bottom structure, said belt moving from an entrance point above the entrance end wall, across the bottom structure, to an exit point above the exit end wall, comprising the steps of:

periodically indexing a drag conveyor through a circulation path in said tank, positioned atop said filter media belt along said circulation path, with said filter belt disposed against said tank along said circulation path to apply a drive force to said filter media belt by said indexing of said drag conveyor;

steeply inclining said exit end wall in excess of 45° from the horizontal; and applying a distributed bias force to said drag conveyor tending to increase the engagement friction with portions of said belt extending along said steeply inclined end wall adjacent said exit point of said filter tank, while accommodation movement of said drag conveyor away from said filter media belt, whereby an enhanced distributed drive force is applied to said filter media belt along said steeply inclined exit end wall through engagement with said drag conveyor.

* * * * *